US012809573B2

(12) United States Patent
Naseef et al.

(10) Patent No.: US 12,809,573 B2
(45) Date of Patent: Nov. 24, 2026

(54) VIRTUAL DIGITAL AUDIO MANAGEMENT FOR SYSTEM FLEXIBILITY

(71) Applicant: QUALCOMM Incorporated, San Diego, CA (US)

(72) Inventors: Syed Naseef, Hyderabad (IN); Mohammed Shadab Ansari, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 18/769,162

(22) Filed: Jul. 10, 2024

(65) Prior Publication Data

US 2026/0017007 A1 Jan. 15, 2026

(51) Int. Cl.
*G06F 3/16* (2006.01)
*G06F 13/10* (2006.01)

(52) U.S. Cl.
CPC ............ *G06F 3/162* (2013.01); *G06F 13/102* (2013.01)

(58) Field of Classification Search
CPC .................................................. G06F 18/2178
See application file for complete search history.

(56) References Cited

U.S. PATENT DOCUMENTS

2020/0044763 A1* 2/2020 Felder ........................ H03F 3/20
2020/0100307 A1* 3/2020 Sridhara .............. H04B 17/318
2020/0413462 A1* 12/2020 Cheong ................. H04W 76/14

* cited by examiner

*Primary Examiner* — Henry Tsai
*Assistant Examiner* — Juanito C Borromeo
(74) *Attorney, Agent, or Firm* — Loza & Loza LLP

(57) ABSTRACT

Aspects of the disclosure are directed to flexible digital audio system interconnectivity. In accordance with one aspect, the disclosure includes assigning a plurality of virtual transport link managers to a plurality of transport links according to a control plane allocation and a data plane allocation; and transporting control plane information and data plane information over the plurality of transport links to a plurality of audio peripherals using the plurality of virtual transport link managers. In one example, the method further includes interconnecting the plurality of transport links to the plurality of audio peripherals with the control plane allocation and with the data plane allocation to form an interconnection.

20 Claims, 14 Drawing Sheets

VIRTUAL DIGITAL AUDIO MANAGEMENT FOR SYSTEM FLEXIBILITY

TECHNICAL FIELD

This disclosure relates generally to the field of digital audio systems, and, in particular, to a flexible multi-channel digital audio system with a plurality of audio peripherals.

BACKGROUND

A digital audio system incorporates a plurality of audio peripherals. such as input transducers and output transducers. The digital audio system may have a variety of configurations with different interconnections from a host (e.g., SOC) to the plurality of audio peripherals. An efficient interconnection architecture may be needed to allow flexible reconfiguration of the digital audio system.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides flexible digital audio system interconnectivity. Accordingly, an apparatus includes a first transport link configured to convey a first information; a second transport link configured to convey a second information; a virtual transport link manager, coupled to the first transport link, the virtual transport link manager configured to enable control information transport or to disable control information transport on the first transport link; a first audio peripheral coupled to the first transport link, the first audio peripheral configured to receive the first information; a second audio peripheral coupled to the second transport link, the second audio peripheral configured to receive the second information; and a primary transport link manager configured to connect to the second transport link.

In one example, the first information is control information for a control plane. In one example, the control information is conveyed to processing functions used for configuration control and policy implementation. In one example, the second information is data information for a data plane. In one example, the second information is another control information for another control plane.

In one example, the apparatus further includes a frequency reference coupled to the first audio peripheral and the second audio peripheral, the frequency reference configured to generate a synchronous clock signal provided to the first audio peripheral and the second audio peripheral. In one example, the frequency reference is a reference oscillator with frequency stability characteristics.

Another aspect of the disclosure provides an apparatus for flexible digital audio system interconnectivity, the apparatus including means for assigning a plurality of virtual transport link managers to a plurality of transport links according to a control plane allocation and a data plane allocation; and means for transporting control plane information and data plane information over the plurality of transport links to a plurality of audio peripherals using the plurality of virtual transport link managers.

In one example, the apparatus further includes means for reconfiguring the plurality of transport links, wherein the means for reconfiguring is enabled in response to a reconfiguration directive and the means for reconfiguring uses an advancement directive subsequent to control plane information transport and data plane information transport. In one example, the apparatus further includes means for interconnecting the plurality of transport links to the plurality of audio peripherals with the control plane allocation and with the data plane allocation; and means for enabling a primary transport link manager and a plurality of virtual transport link managers in a digital audio system.

Another aspect of the disclosure provides a method including assigning a plurality of virtual transport link managers to a plurality of transport links according to a control plane allocation and a data plane allocation; and transporting control plane information and data plane information over the plurality of transport links to a plurality of audio peripherals using the plurality of virtual transport link managers. In one example, the method further includes interconnecting the plurality of transport links to the plurality of audio peripherals with the control plane allocation and with the data plane allocation to form an interconnection.

In one example, the interconnection includes an enumeration of the plurality of audio peripherals. In one example, the enumeration assigns identification labels to distinguish each of the plurality of audio peripherals. In one example, if the interconnection of one of the plurality of transport links includes the control plane allocation and the data plane allocation, then set a transport link configuration word for the one of the plurality of transport links to an enabled state. In one example, the plurality of audio peripherals is in a digital audio system.

In one example, the method further includes reconfiguring the plurality of transport links in response to a reconfiguration directive. In one example, the method further includes using an advancement directive for the reconfiguring. In one example, the reconfiguring is performed subsequent to performing the transporting control plane information and data plane information. In one example, the method further includes enabling a primary transport link manager and the plurality of virtual transport link managers in a digital audio system.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
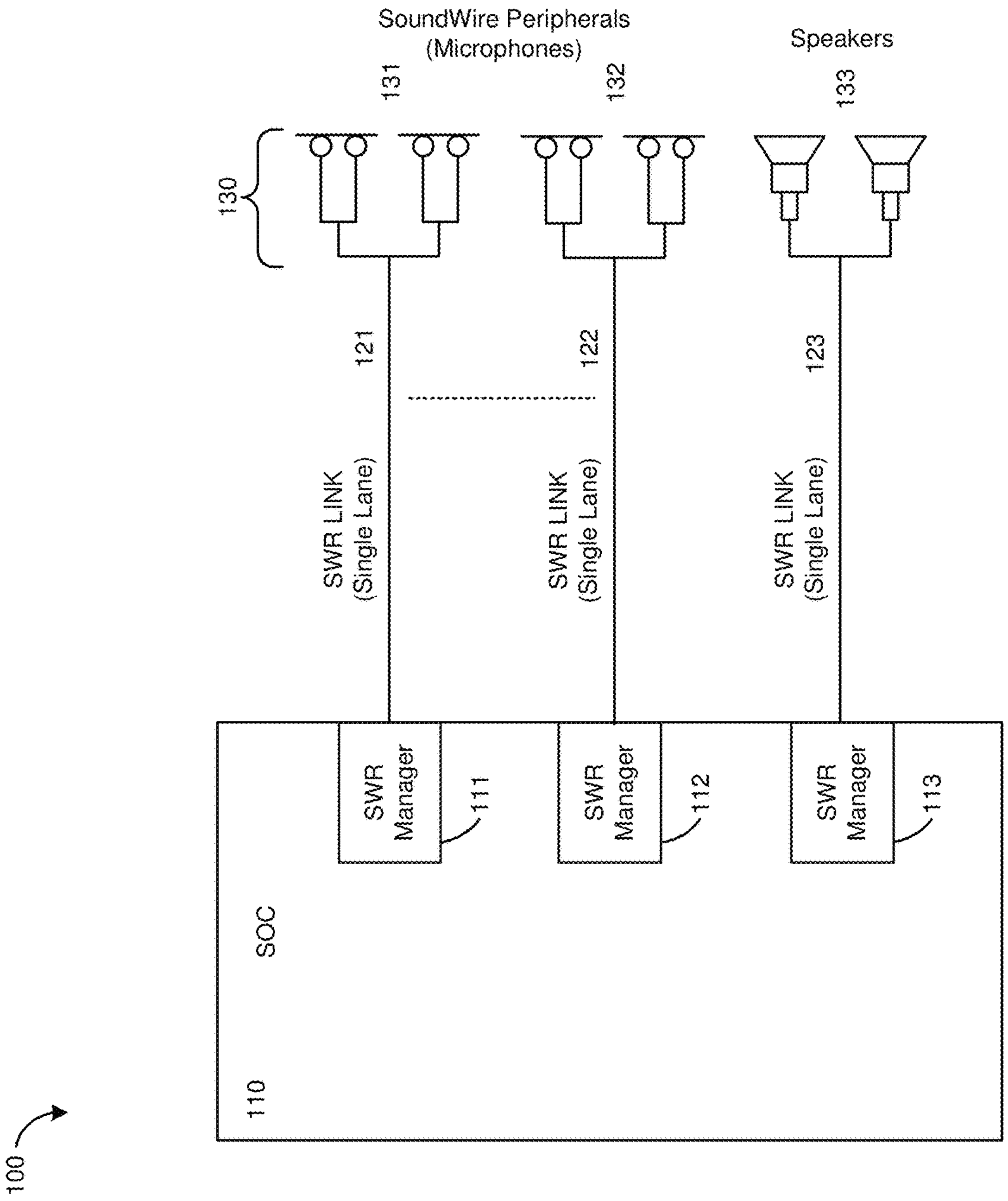
FIG. 1 illustrates a block diagram of a first example digital audio system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

A digital audio system conveys a digital audio signal from a plurality of sources to a plurality of destinations. The digital audio signal may be received from an input transducer, such as a microphone, which converts an input acoustic signal to the digital audio signal. The digital audio signal may be transported to an output transducer, such as a speaker, which converts the digital audio signal to an output acoustic signal. A multi-channel digital audio system operates with a plurality of audio peripherals such as input transducers and output transducers with flexible interconnectivity.

In one example, the digital audio system delivers audio information using digital signal formats with source encoding to reduce an audio data rate using audio compression. The digital signal format may also include channel encoding and interleaving to mitigate random and burst channel errors.

In one example, the digital audio system may convey control information for a control plane and may convey data information for a data plane. In one example, an information processing system may be functionally partitioned among a plurality of planes such as a control plane, a data plane, a management plane, etc. In one example, the control plane includes processing functions used for configuration control and policy implementation. In one example, the data plane includes processing functions used for data transport and data manipulation or transformation. In one example, the control plane is used to configure the data plane in a real-time or near-real time basis. In one example, the management plane includes processing functions for overall operations policy and architectural establishment prior to an operational phase using the control plane and the data plane.

FIG. 1 illustrates a block diagram of a first example digital audio system 100. The first example digital audio system 100 includes a host 110 such as a system on a chip (SOC) with a plurality of transport link managers (e.g., SoundWire manager) such as a first transport link manager 111, a second transport link manager 112 and a third transport link manager 113. In one example, the plurality of transport link managers is connected to a plurality of audio peripherals 130 via a plurality of transport links such as a first transport link 121 (e.g., first SoundWire link) with a single lane, a second transport link 122 with a single lane and a third transport link 123 with a single lane. In one example, a lane is equivalent to a transmission line (i.e., a one-dimensional waveguide structure). In one example, the plurality of audio peripherals 130 includes a first audio peripheral 131 (e.g., a first plurality of microphones), a second plurality of audio peripherals 132 (e.g., a second plurality of microphones) and a third plurality of audio peripherals 133 (e.g., a plurality of speakers). In one example, the first example digital audio system 100 may be for an extended reality (XR) application.

Figure 2:
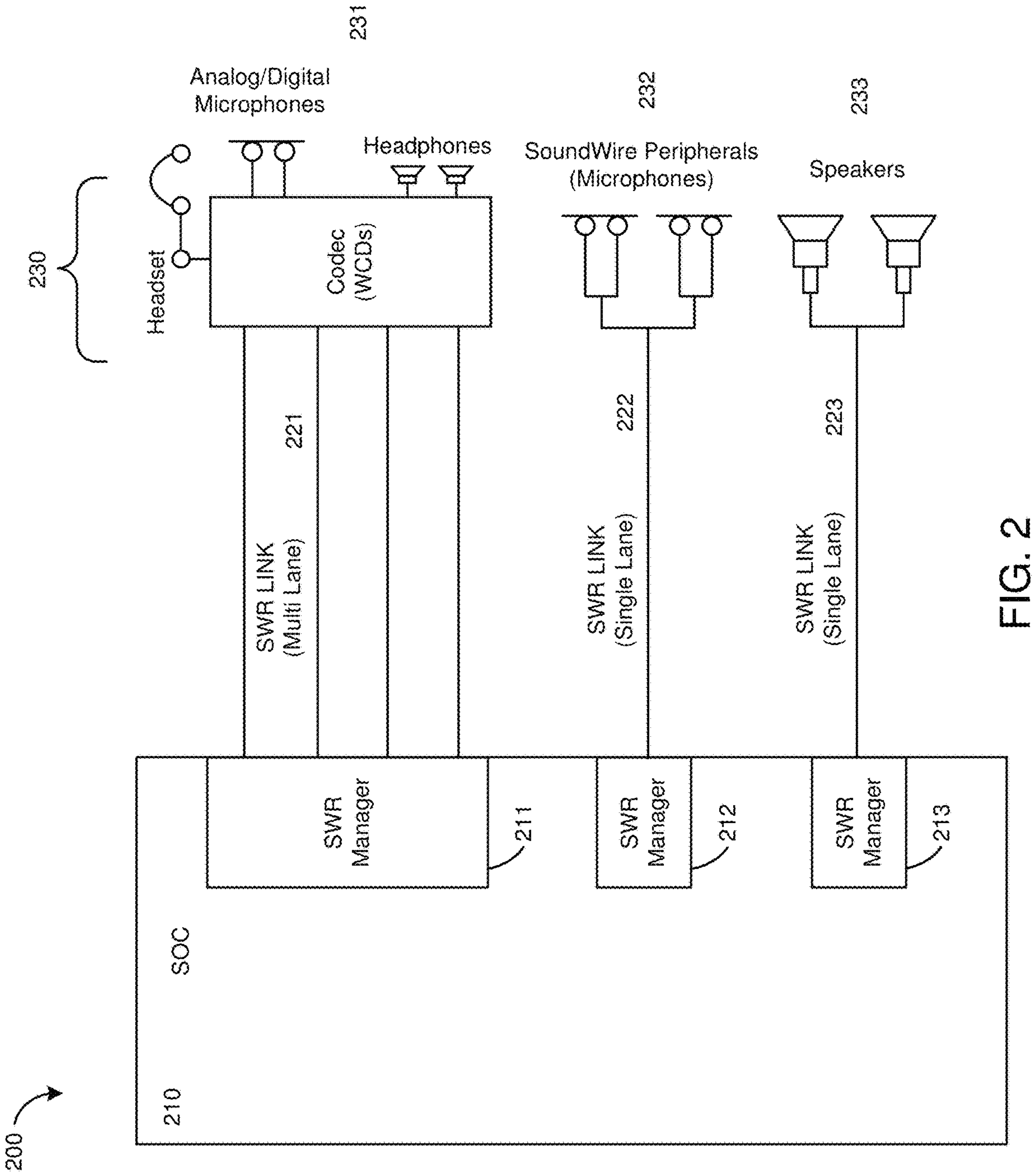
FIG. 2 illustrates a block diagram of a second example digital audio system.

FIG. 2 illustrates a block diagram of a second example digital audio system 200. The second example digital audio system 200 includes a host 210 such as a system on a chip (SOC) with a plurality of transport link managers (e.g., SoundWire manager) such as a first transport link manager 211, a second transport link manager 212 and a third transport link manager 213. In one example, the plurality of transport link managers is connected to a plurality of audio peripherals 230 via a plurality of transport links such as a first transport link 221 (e.g., first SoundWire link) with multiple lanes, a second transport link 222 with a single lane and a third transport link 223 with a single lane. In one example, the plurality of audio peripherals 230 includes a first audio peripheral 231 (e.g., a codec with a first plurality of audio peripherals), a second plurality of audio peripherals 232 (e.g., a plurality of microphones) and a third plurality of audio peripherals 233 (e.g., a plurality of speakers). In one example, the second example digital audio system 200 may be for a compute/mobile application.

In one example, the plurality of transport links may be reconfigured according to a variety of use cases or applications for a plurality of products. In one example, an extended reality (XR) application may require only a plurality of microphones and a plurality of speakers. In one example, compute/mobile application may require a plurality of audio peripherals along with a multi-lane coder/decoder (i.e., codec). In one example, a transport link in the plurality of transport links may be a single lane transport link (i.e., with one transmission line). In one example, a transport link in the plurality of transport links may be a multi-lane transport link (i.e., with more than one transmission line). In one example, data transport with a single lane transport link or a multi-lane transport link may be governed by a data transport protocol. In one example, the data transport protocol may specify protocol rules for interface compatibility among different audio peripherals.

In one example, an audio peripheral attached to a multi-lane transport link with a plurality of lanes may be required to convey control information in a first lane (e.g., lane 0) of the plurality of lanes to comply with protocol rules from a data transport protocol. In one example, the first lane may have limited bandwidth or throughput which may force usage of additional transport managers and/or additional lanes. For example, different hardware configurations and applications result in a need for flexible reconfiguration of audio peripheral connectivity.

Figure 3:
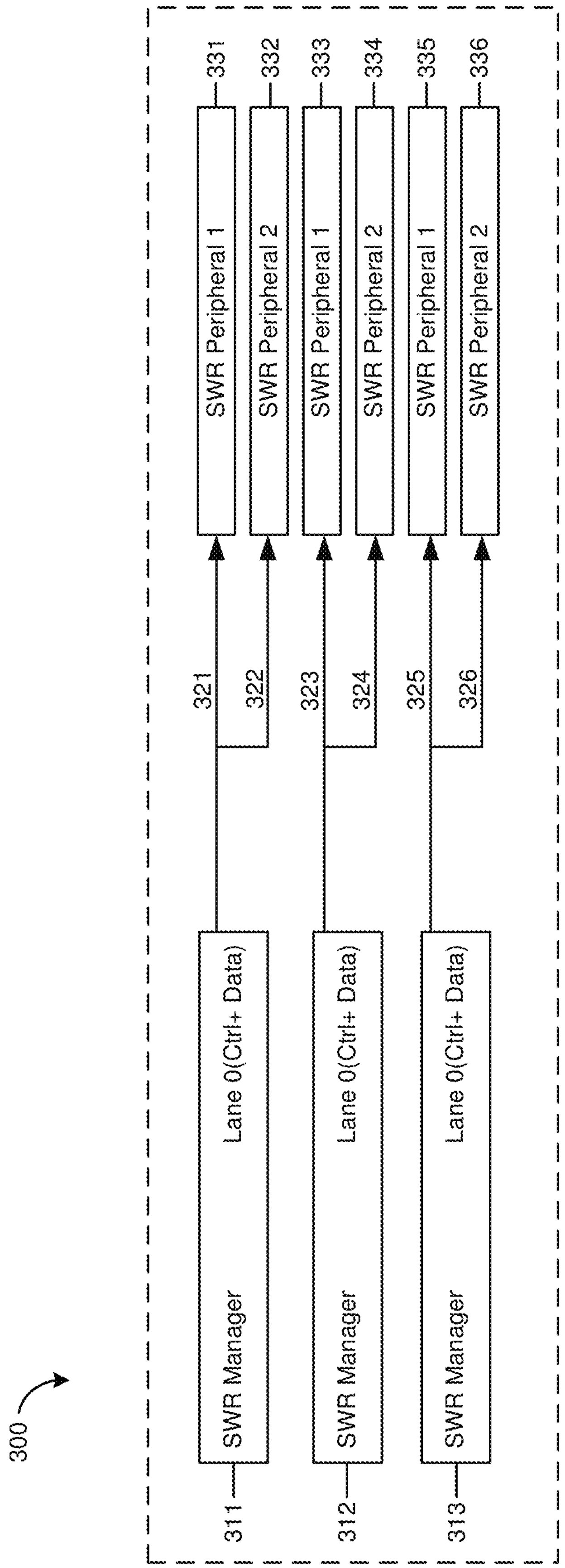
FIG. 3 illustrates a first example of a digital audio system scenario.

FIG. 3 illustrates a first example of a digital audio system scenario 300. In one example, the digital audio system scenario 300 includes a first transport link manager 311 with a first transport link 321 connected to a first audio peripheral 331 and a second transport link 322 connected to a second audio peripheral 332. In one example, the digital audio system scenario 300 includes a second transport link manager 312 with a third transport link 323 connected to a third audio peripheral 333 and a fourth transport link 324 connected to a fourth audio peripheral 334. In one example, the digital audio system scenario 300 includes a third transport link manager 313 with a fifth transport link 325 connected to a fifth audio peripheral 335 and sixth transport link 326 connected to a sixth audio peripheral 336. In one example, the first transport link 321, the third transport link 323 and the fifth transport link 325 convey both control information for a control plane and data information for a data plane, whereas the second transport link 322, the fourth transport link 324 and the sixth transport link 326 convey only data information.

Figure 4:
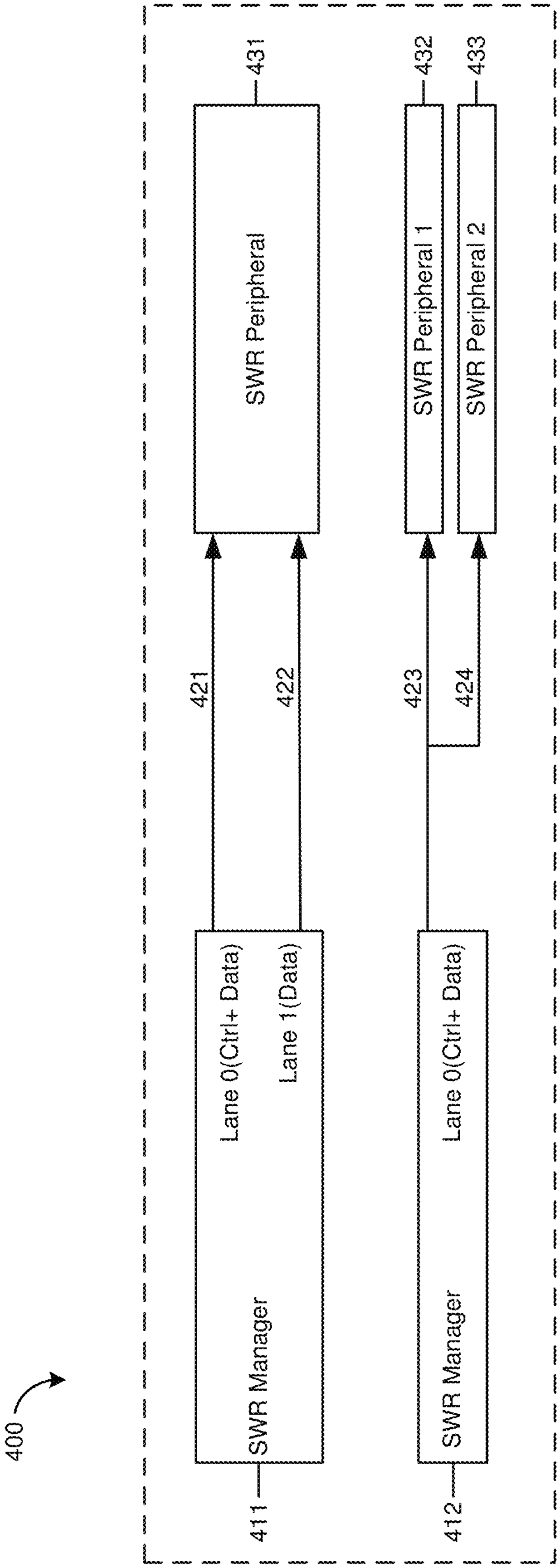
FIG. 4 illustrates a second example of a digital audio system scenario.

FIG. 4 illustrates a second example of a digital audio system scenario 400. In one example, the digital audio system scenario 400 includes a first transport link manager 411 with a first transport link 421 and a second transport link 422 connected to a first audio peripheral 431. In one example, the digital audio system scenario 400 includes a second transport link manager 412 with a third transport link 423 connected to a second audio peripheral 432 and a fourth transport link 424 connected to a third audio peripheral 433. In one example, the first transport link 421 and the third transport link 423 convey both control information for a control plane and data information for a data plane, whereas the second transport link 422 and the fourth transport link 424 convey only data information.

Figure 5:
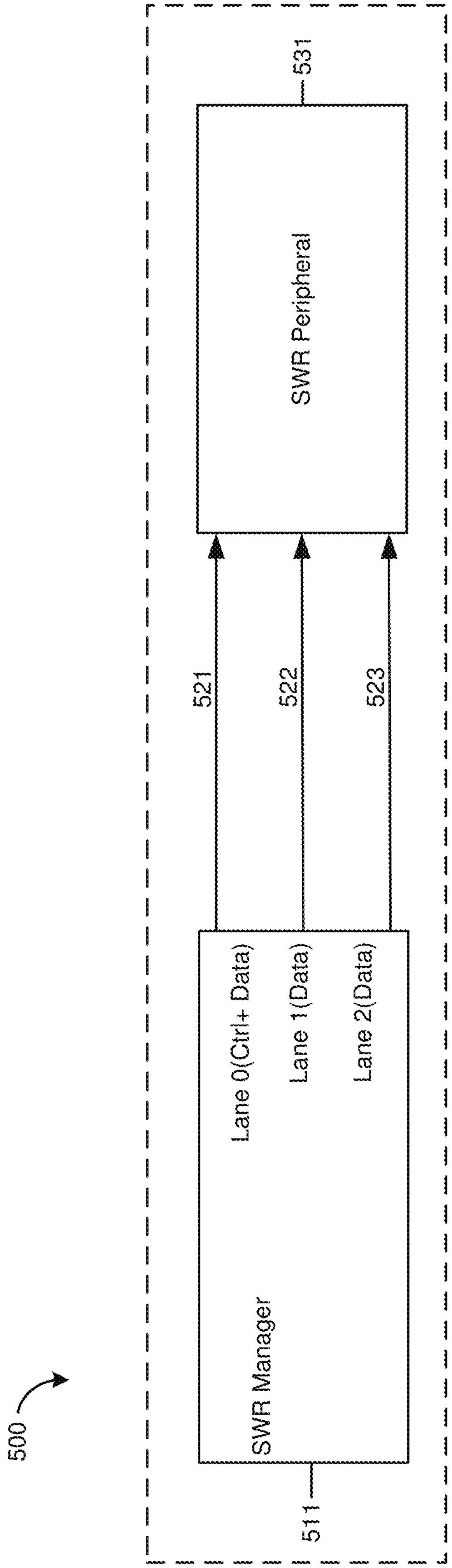
FIG. 5 illustrates a third example of a digital audio system scenario.

FIG. 5 illustrates a third example of a digital audio system scenario 500. In one example, the digital audio system scenario 500 includes a transport link manager 511 with a first transport link 521, a second transport link 522 and a third transport link 523 connected to an audio peripheral 531. In one example, the first transport link 521 conveys both control information for a control plane and data information for a data plane. In one example, the second transport link 522 and the third transport link 523 convey only data information for a data plane.

In one example, a specific hardware configuration of a transport link manager may be customized for a specific set of system applications which may limit flexibility. In one example, provisioning a larger quantity of transport link managers may accommodate more system applications but at a higher cost.

In one example, a virtual transport link manager is a configurable transport link manager which may be enabled or disabled according to application requirements. In one example, a virtual transport link manager may shadow a first lane (e.g., lane 0) of a transport link to enable control information transport (e.g., for a control plane) on other lanes as an optional capability.

Figure 6:
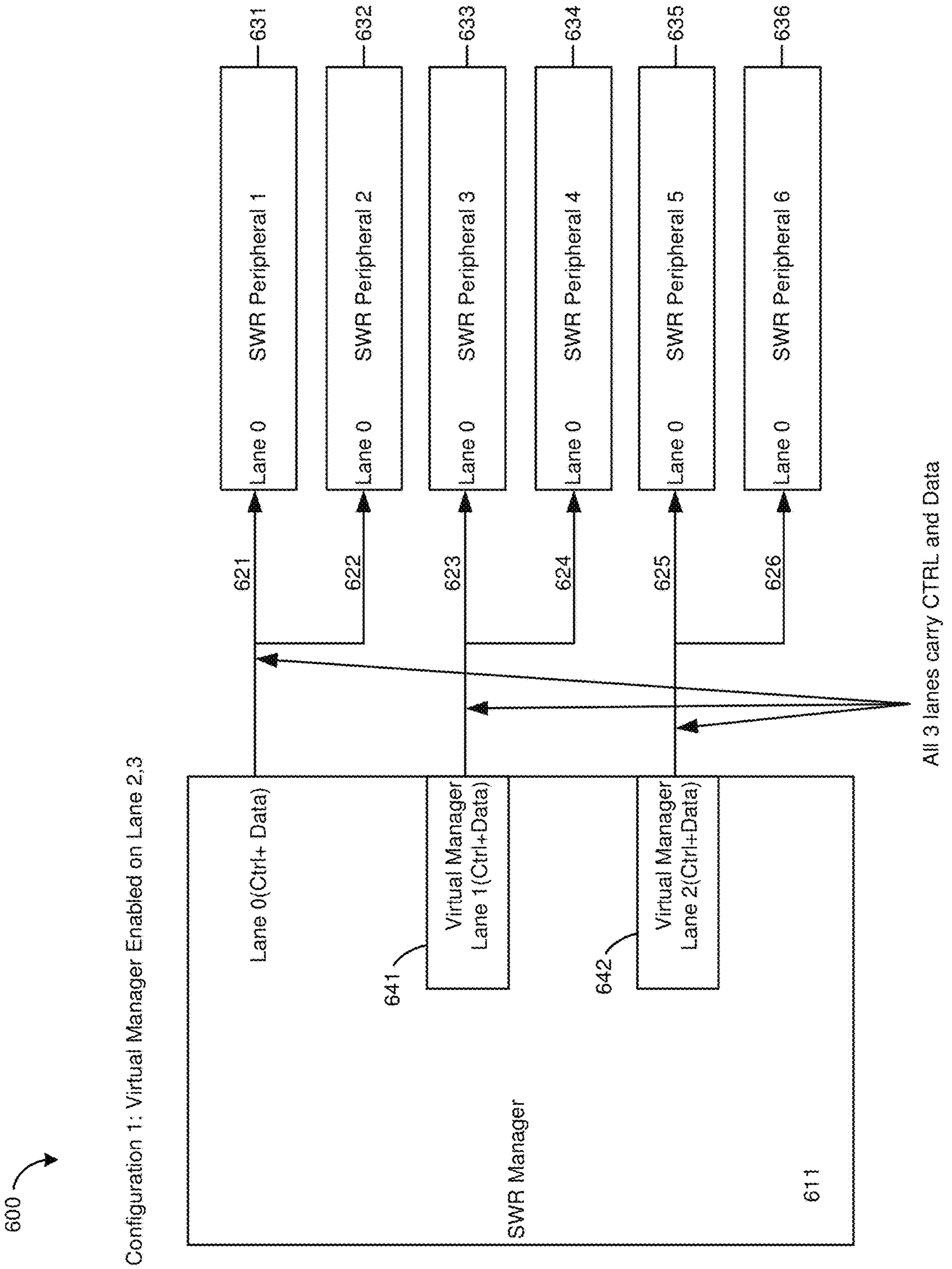
FIG. 6 illustrates a fourth example of a digital audio system scenario.

FIG. 6 illustrates a fourth example of a digital audio system scenario 600. In one example, the digital audio system scenario 600 includes a transport link manager 611 with a first transport link 621 connected to a first audio peripheral 631 and a second transport link 622 connected to a second audio peripheral 632. In one example, the digital audio system scenario 600 includes a third transport link 623 connected to a third audio peripheral 633, a fourth transport link 624 connected to a fourth audio peripheral 634, a fifth transport link 625 connected to a fifth audio peripheral 635 and a sixth transport link 626 connected to a sixth audio peripheral 636. In one example, the first transport link 621 and the second transport link 622 convey both control information to a control plane and data information to a data plane using the transport link manager 611.

In one example, the digital audio system scenario 600 also includes a first virtual transport link manager 641 connected to the third transport link 623 and a second virtual transport link manager 642 connected to the fifth transport link 625. In one example, the first virtual transport link manager 641 enables the third transport link 623 and the fourth transport link 624 to convey both control information on the control plane and data information on the data plane. In one example, the second virtual transport link manager 642 enables the fifth transport link 625 and the sixth transport link 626 to convey both control information on the control plane and data information on the data plane.

Figure 7:
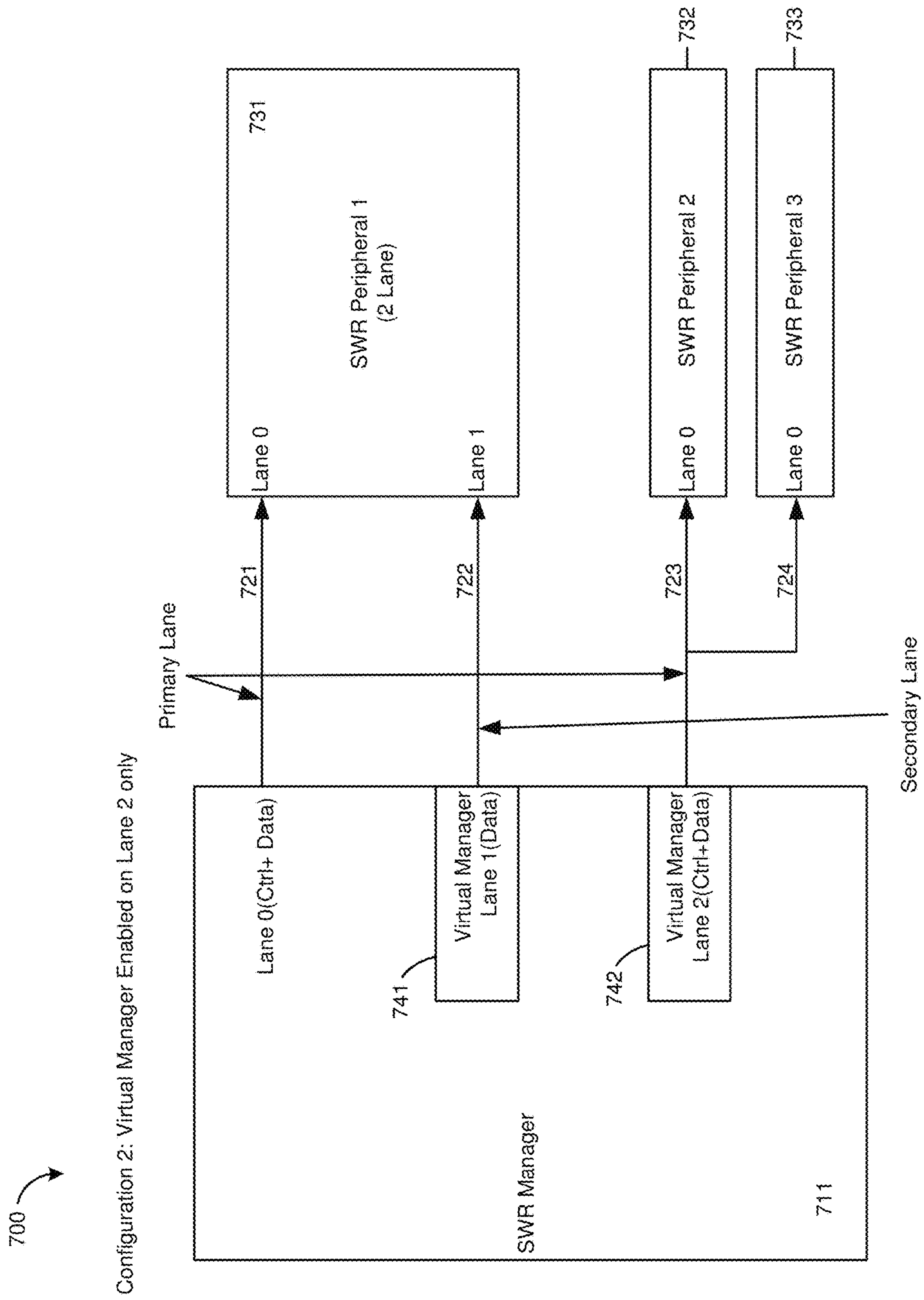
FIG. 7 illustrates a fifth example of a digital audio system scenario.

FIG. 7 illustrates a fifth example of a digital audio system scenario 700. In one example, the digital audio system scenario 700 includes a transport link manager 711 with a first transport link 721 and a second transport link 722 connected to a first audio peripheral 731. In one example, the digital audio system scenario 700 includes a third transport link 723 connected to a second audio peripheral 732 and a fourth transport link 724 connected to a third audio peripheral 733. In one example, the first transport link 721 conveys both control information to a control plane and data information to a data plane using the transport link manager 711.

In one example, the digital audio system scenario 700 also includes a first virtual transport link manager 741 connected to the second transport link 722 and a second virtual transport link manager 742 connected to the third transport link 723 and the fourth transport link 724. In one example, the first virtual transport link manager 741 enables the second transport link 722 to convey only data information on the data plane. In one example, the second virtual transport link manager 742 enables the third transport link 723 and the fourth transport link 724 to convey both control information on the control plane and data information on the data plane. In one example, the first transport link 721, the third transport link 723 and the fourth transport link 724 are denoted as primary lanes (i.e., lanes that convey both control information and data information). In one example, the second transport link 722 is denoted as a secondary lane (i.e., a lane that conveys only data information).

Figure 8:
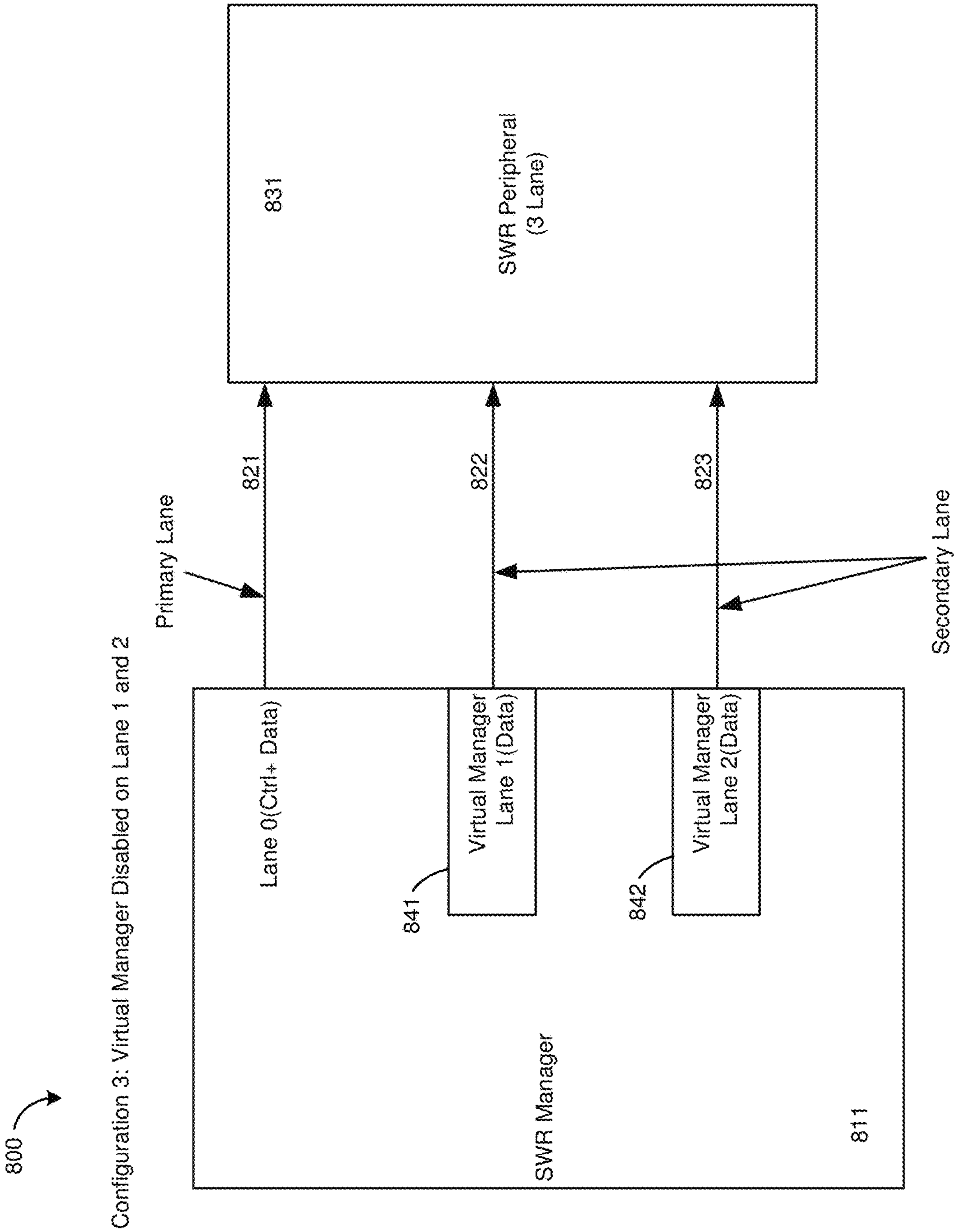
FIG. 8 illustrates a sixth example of a digital audio system scenario.

FIG. 8 illustrates a sixth example of a digital audio system scenario 800. In one example, the digital audio system scenario 800 includes a transport link manager 811 with a first transport link 821, a second transport link 822 and a third transport link 823 connected to an audio peripheral 831. In one example, the first transport link 821 conveys both control information to a control plane and data information to a data plane using the transport link manager 811.

In one example, the digital audio system scenario 800 also includes a first virtual transport link manager 841 connected to the second transport link 822 and a second virtual transport link manager 842 connected to the third transport link 823. In one example, the first virtual transport link manager 841 enables the second transport link 822 to convey only data information on the data plane. In one example, the second virtual transport link manager 842 enables the third transport link to convey only data information on the data plane. In one example, the first transport link 821 is denoted as a primary lane (i.e., a lane that convey both control information and data information). In one example, the second transport link 822 and the third transport link 823 are denoted as secondary lanes (i.e., lanes that convey only data information).

In one example, an audio peripheral with different lane configurations may be attached to a transport link based on application requirements. In one example, a digital audio system protocol may mandate that all audio peripherals are connected to a primary lane. In one example, the primary lane may have limited bandwidth.

In one example, all single lane audio peripherals is accommodated in a limited bandwidth available on a primary lane. As a result, for example, additional data lanes or addition transport link managers may be required which adds cost in interfaces and in chip area. In one example, a multi-lane peripheral is an additional load on the transport links which result in a higher dc power consumption and more complex interface timing requirements. In one example, an increase in transport link managers may result in additional chip area and interface growth along with additional software complexity for transport link management.

In one example, the digital audio system maintains synchronization and syntonization among the plurality of audio peripherals. In one example, synchronization relates to relative alignment in time. In one example, syntonization relates to relative alignment in frequency. In one example, synchronization and syntonization in the digital audio system may be established with a synchronous clock signal distributed from a frequency reference (not shown). In one example, the frequency reference is a reference oscillator with frequency stability characteristics governed by an application. For example, frequency stability characteristics may be frequency variation over an environmental range or over time. In one example, frequency stability characteristics may be random frequency statistical properties such as Allan deviation or phase noise spectral density.

In one example, the synchronous clock signal is based on a reference oscillator waveform from the reference oscillator with an integrated timing jitter less than a specified fraction of a synchronous clock cycle. In one example, the integrated timing jitter is determined by the reference oscillator phase noise spectral density. In one example, the integrated timing jitter is determined by an integral of the reference oscillator phase noise spectral density from a system time constant reciprocal to a system bandwidth. In one example, the system time constant reciprocal is a multiplicative inverse of a characteristic time of a phased locked loop (PLL).

Figure 9:
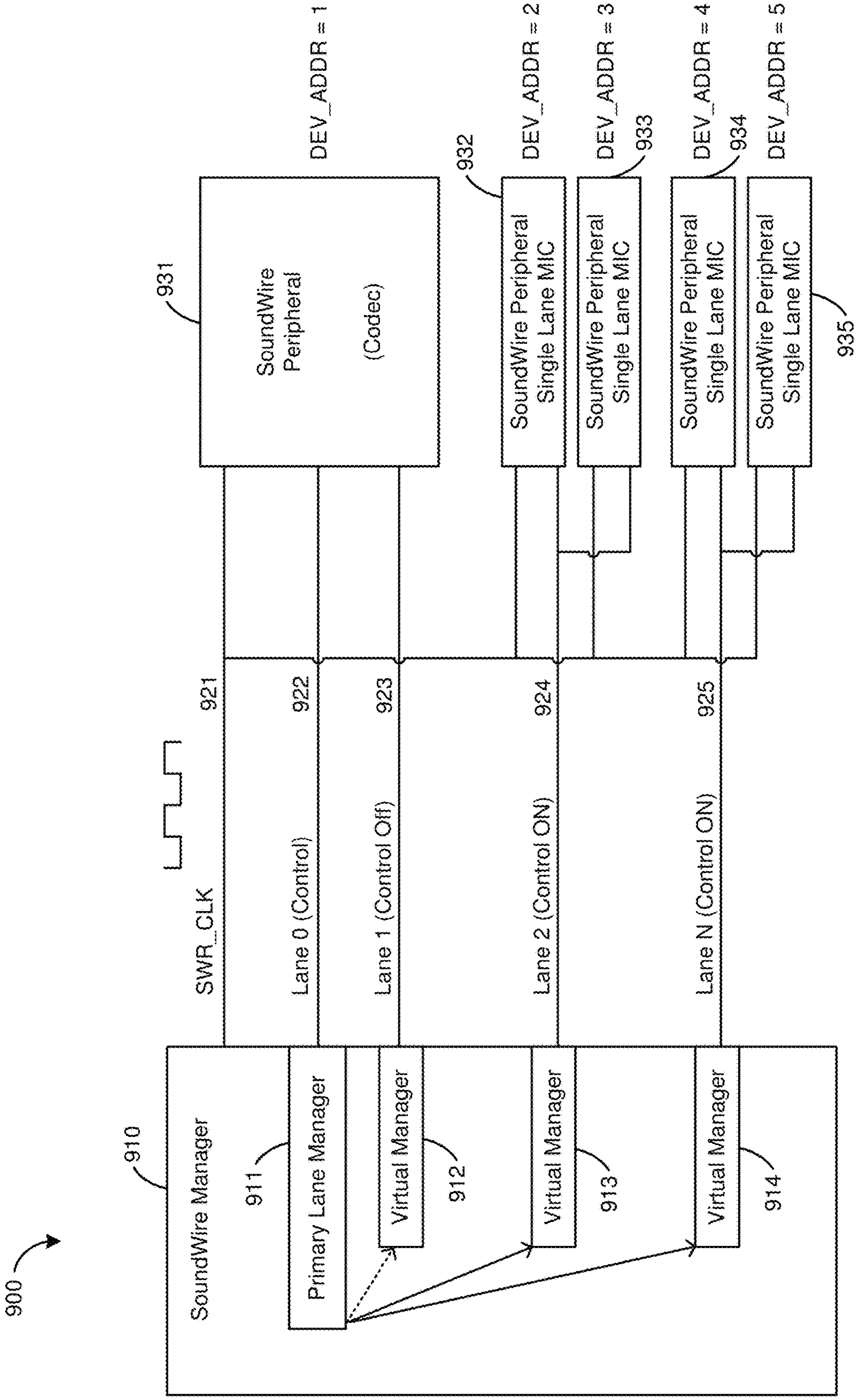
FIG. 9 illustrates a first example of a virtual transport link manager solution.

FIG. 9 illustrates a first example of a virtual transport link manager solution 900. In one example, the virtual transport link manager solution 900 includes a transport link manager 910 which includes a primary transport link manager 911, a first virtual transport link manager 912, a second virtual transport link manager 913 and a third virtual transport link manager 914.

In one example, the transport link manager 910 sends a synchronous clock signal 921 to a first audio peripheral 931, a second audio peripheral 932, a third audio peripheral 933, a fourth audio peripheral 934 and a fifth audio peripheral 935. In one example, the primary transport link manager 911 connects a first transport link (e.g., lane0) 922 to the first audio peripheral 931. In one example, the first virtual transport link manager 912 connects a second transport link (e.g., lane1) 923 to the first audio peripheral 931. In one example, the second virtual transport link manager 913 connects a third transport link (e.g., lane2) 924 to the second audio peripheral 932 and the third audio peripheral 933. In one example, the third virtual transport link manager 914 connects a fourth transport link (e.g., laneN) 925 to the fourth audio peripheral 934 and the fifth audio peripheral 935.

In one example, the transport link manager 910 enables control information transport on the first transport link 922, disables control information transport on the second transport link 923, enables control information transport on the third transport link 924 and enables control information transport on the fourth transport link 925.

In one example, a virtual transport link manager is a shadow (i.e., replica) of a primary transport link manager with negligible chip area to either enable or disable control information transport by a configuration setting. In one example, all control information managed by the virtual transport link manager is identical to that managed by the transport link manager, with the exception of enumeration commands. In one example, enumeration commands are identification assignment commands to distinguish a plurality of audio peripherals.

In one example, when the virtual transport link manager is enabled, a lane controlled by it acts as a primary lane (i.e. with both control information and data information). In one example, when the virtual transport link manager is disabled, the lane controlled by it acts as a secondary lane (i.e., with data information only). In one example, the enablement or disablement may be selected according to a scenario or application.

In one example, usage of a virtual transport link manager allows an audio peripheral to be connected on a secondary lane where control information transport may be enabled or disabled by configuration. In one example, the virtual link manager promotes dc power efficiency by distribution of control information flow across a plurality of lanes.

Figure 10:
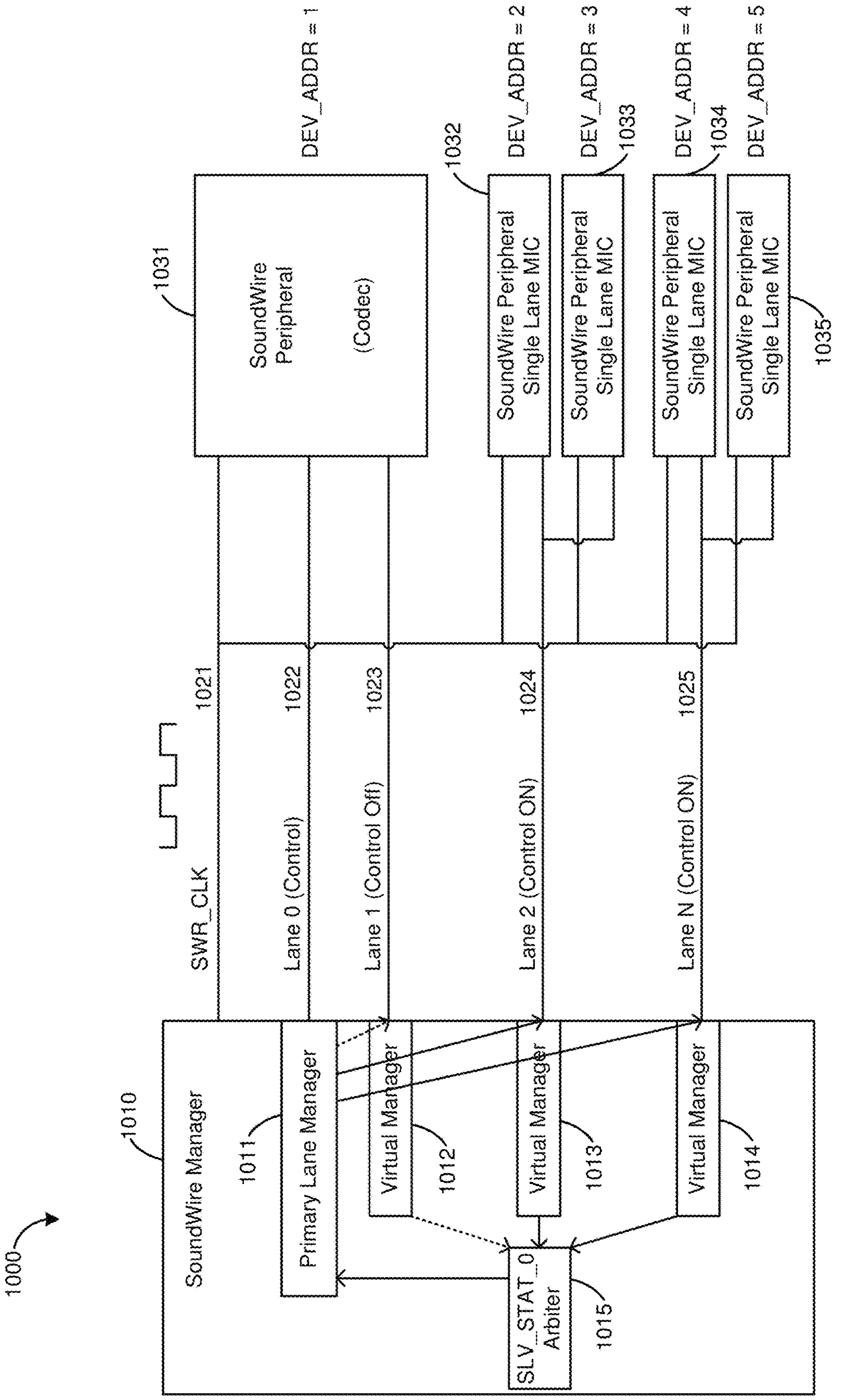
FIG. 10 illustrates a second example of a virtual transport link manager solution.

FIG. 10 illustrates a second example of a virtual transport link manager solution 1000. In one example, the virtual transport link manager solution 1000 includes a transport link manager 1010 which includes a primary transport link manager 1011, a first virtual transport link manager 1012, a second virtual transport link manager 1013 and a third virtual transport link manager 1014.

In one example, the transport link manager 1010 also includes an arbiter 1015. In one example, the arbiter 1015 receives enumeration directives from the first virtual transport link manager 1012, the second virtual transport link manager 1013 and the third virtual transport link manager 1014. In one example, the arbiter 1015 regulates access to the primary transport link manager 1011 according to an arbitration protocol. In one example, the arbitration protocol may be round robin arbitration, priority arbitration, etc. In one example, the arbitration protocol controls arbitration to each lane in a transport link.

In one example, the arbiter 1015 may enumerate each audio peripheral of a plurality of peripherals upon receiving enumeration directives. In one example, enumeration assigns identification labels to distinguish each audio peripheral in the plurality of audio peripherals. In one example, the arbiter 1015 performs enumeration only for enabled virtual transport link managers. In one example, the arbiter 1015 does not perform enumeration for disabled virtual transport link managers.

In one example, the transport link manager 1010 sends a synchronous clock signal 1021 to a first audio peripheral 1031, a second audio peripheral 1032, a third audio peripheral 1033, a fourth audio peripheral 1034 and a fifth audio peripheral 1035.

In one example, the primary transport link manager 1011 connects a first transport link (e.g., lane0) 1022 to the first audio peripheral 1031. In one example, the first virtual transport link manager 1012 connects a second transport link (e.g., lane1) 1023 to the first audio peripheral 1031. In one example, the second virtual transport link manager 1013 connects a third transport link (e.g., lane2) 1024 to the second audio peripheral 1032 and the third audio peripheral 1033. In one example, the third virtual transport link manager 1014 connects a fourth transport link (e.g., laneN) 1025 to the fourth audio peripheral 1034 and the fifth audio peripheral 1035. In one example, each audio peripheral may be distinguished by a unique identifier or address (e.g., DEV_ADDR=x).

In one example, the transport link manager 1010 enables control information transport on the first transport link 1022, disables control information transport on the second transport link 1023, enables control information transport on the third transport link 1024 and enables control information transport on the fourth transport link 1025.

Figure 11:
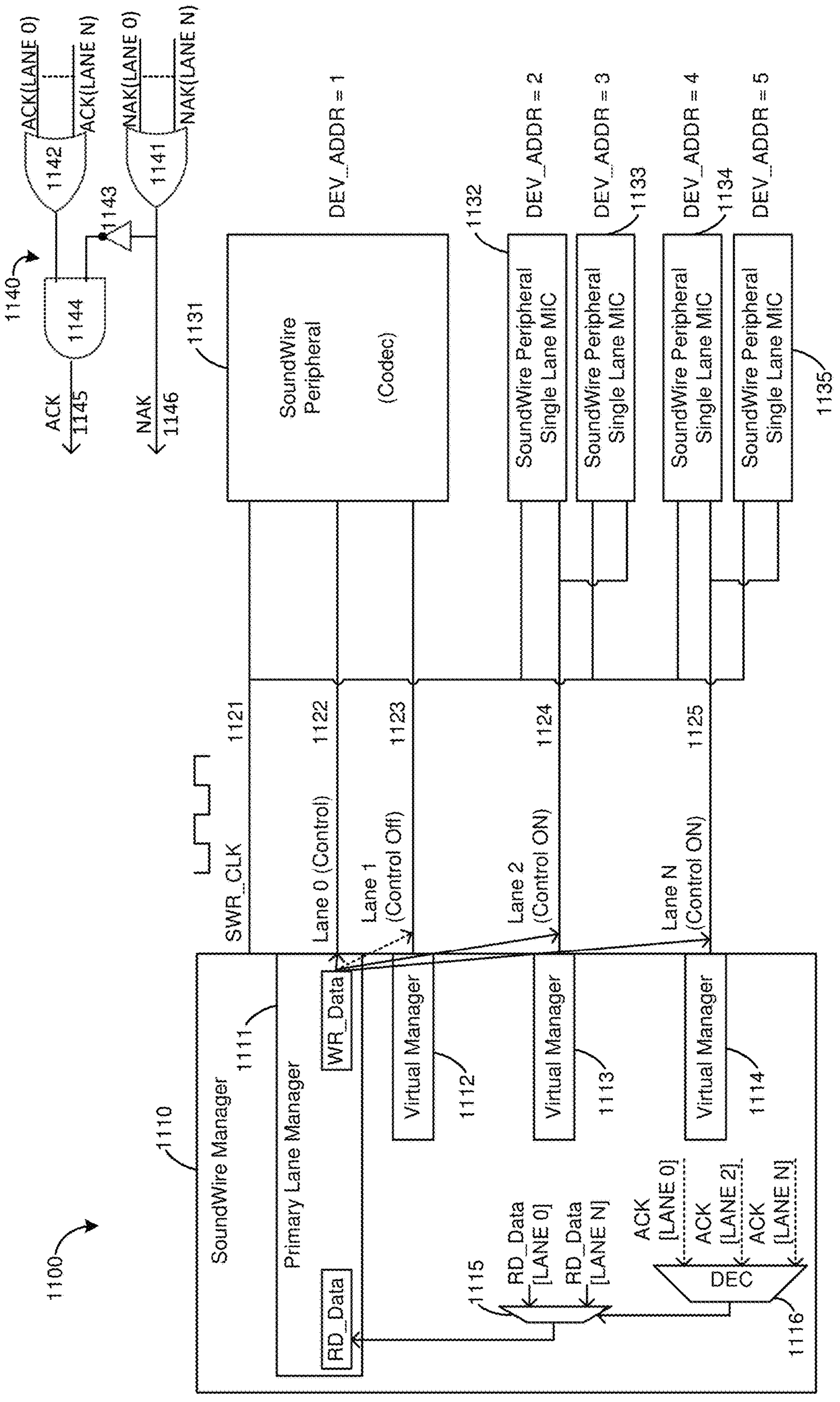
FIG. 11 illustrates a third example of a virtual transport link manager solution.

FIG. 11 illustrates a third example of a virtual transport link manager solution 1100. In one example, the virtual transport link manager solution 1100 includes a transport link manager 1110 which includes a primary transport link manager 1111, a first virtual transport link manager 1112, a second virtual transport link manager 1113 and a third virtual transport link manager 1114.

In one example, the transport link manager 1110 also includes acknowledgment digital logic. In one example, the acknowledgment digital logic includes a first multiplexer 1115 and a second multiplexer 1116. In one example, the first multiplexer 1115 accepts a plurality of read data lanes (e.g., RD_DATA) at its input and selectively connects each read data lane of the plurality of read data lanes to an input of the primary transport link manager 1111 according to a plurality of acknowledgment signals accepted by the second multiplexer 1116. In one example, there is a one-to-one mapping of acknowledgment signals to read data lanes (i.e., both have a dimension N). In one example, each selectively connected read data lane sends read data to a buffer in the primary transport link manager 1111 if its respective acknowledgment signal is received.

In one example, the acknowledgement digital logic also includes acknowledgment/negative acknowledgment (ACK/NACK) logic 1140 with a first OR logic gate 1141 with a plurality of NACK inputs, a second OR logic gate 1142 with a plurality of ACK inputs, and inverter logic gate 1143 and a AND logic gate 1144. In one example, the ACK/NACK logic 1140 generates an ACK signal 1145 and a NACK signal 1146. In one example, the ACK signal 1145 and the NACK signal 1146 are received and consumed by the transport link manager 1110. In one example, if a virtual transport link manager is disabled, inference of the ACK signal 1145 may be obtained by a lack of a NACK signal 1146 to other virtual transport managers which are enabled.

In one example, the transport link manager 1110 sends a synchronous clock signal 1121 to a first audio peripheral 1131, a second audio peripheral 1132, a third audio peripheral 1133, a fourth audio peripheral 1134 and a fifth audio peripheral 1135.

In one example, the primary transport link manager 1111 connects a first transport link (e.g., lane0) 1122 to the first audio peripheral 1131. In one example, the first virtual transport link manager 1112 connects a second transport link (e.g., lane1) 1123 to the first audio peripheral 1131. In one example, the second virtual transport link manager 1113 connects a third transport link (e.g., lane2) 1124 to the second audio peripheral 1132 and the third audio peripheral 1133. In one example, the third virtual transport link manager 1114 connects a fourth transport link (e.g., laneN) 1125 to the fourth audio peripheral 1134 and the fifth audio peripheral 1135. In one example, each audio peripheral may be distinguished by a unique identifier or address (e.g., DEV_ADDR=x).

In one example, the transport link manager 1110 enables control information transport on the first transport link 1122, disables control information transport on the second transport link 1123, enables control information transport on the third transport link 1124 and enables control information transport on the fourth transport link 1125.

Figure 12:
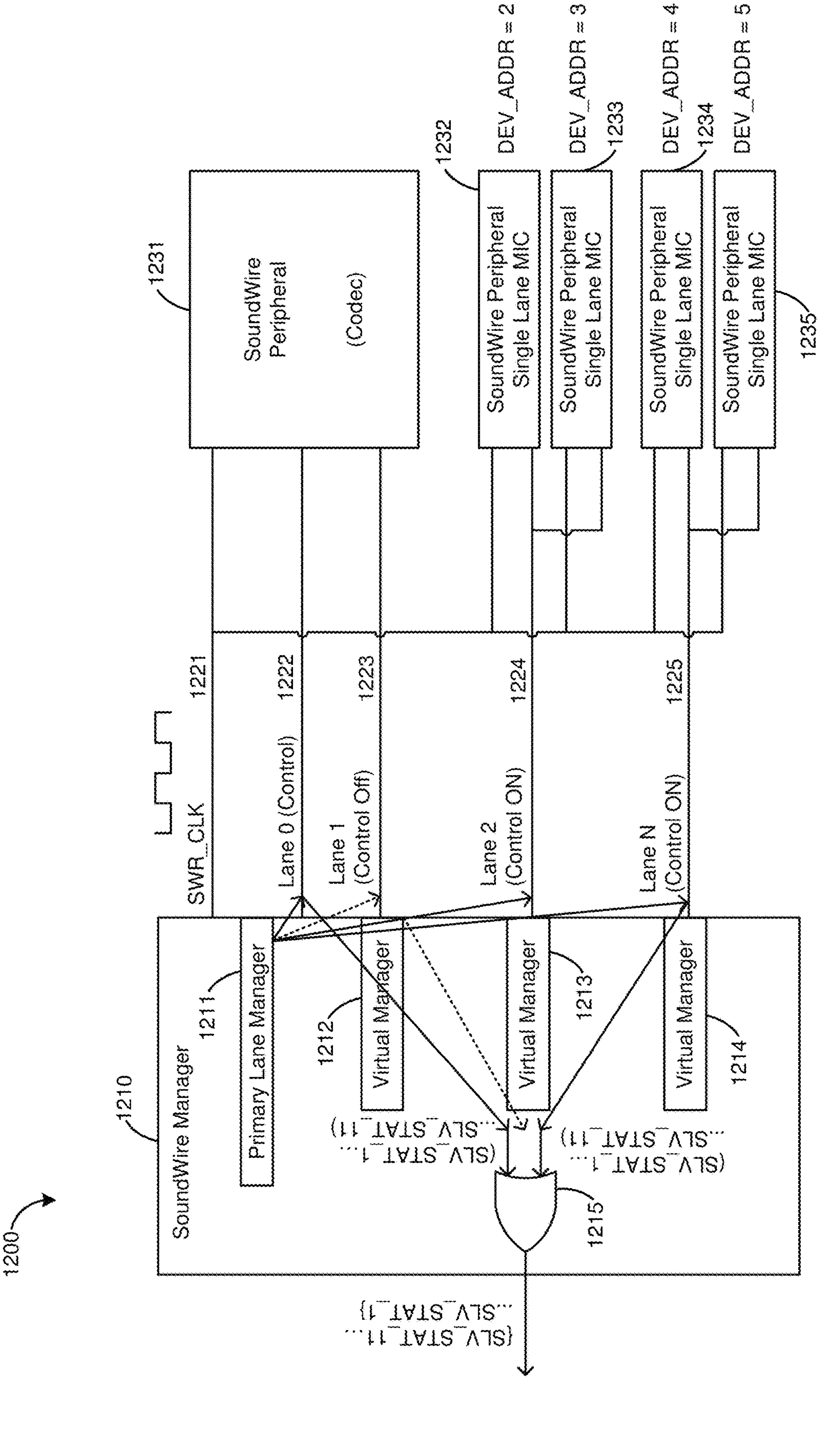
FIG. 12 illustrates a fourth example of a virtual transport link manager solution.

FIG. 12 illustrates a fourth example of a virtual transport link manager solution 1200. In one example, the virtual transport link manager solution 1200 includes a transport link manager 1210 which includes a primary transport link manager 1211, a first virtual transport link manager 1212, a second virtual transport link manager 1213 and a third virtual transport link manager 1214.

In one example, the transport link manager 1210 also includes an OR logic gate 1215 to merge a lane state signal (e.g., SLV_STAT) from each transport link (i.e., lane) to form an aggregate lane status signal sent to a system controller (e.g., system software), not shown. In one example, each lane state signal is merged only if its corresponding virtual transport link manager is enabled. In one example, each enumerated peripheral of a plurality of peripherals has a dedicated time slot in a ping command which is based on a device address assigned to each enumerated peripheral. In one example, the lane status signal (e.g., SLV_STAT) is an indicator for an audio peripheral to denote its status (e.g., not connected, connected, alert, etc.) to the transport link manager 1210.

In one example, the transport link manager 1210 sends a synchronous clock signal 1221 to a first audio peripheral 1231, a second audio peripheral 1232, a third audio peripheral 1233, a fourth audio peripheral 1234 and a fifth audio peripheral 1235.

In one example, the primary transport link manager 1211 connects a first transport link (e.g., lane0) 1222 to the first audio peripheral 1231. In one example, the first virtual transport link manager 1212 connects a second transport link (e.g., lane1) 1223 to the first audio peripheral 1231. In one example, the second virtual transport link manager 1213 connects a third transport link (e.g., lane2) 1224 to the second audio peripheral 1232 and the third audio peripheral 1233. In one example, the third virtual transport link manager 1214 connects a fourth transport link (e.g., laneN) 1225 to the fourth audio peripheral 1234 and the fifth audio peripheral 1235. In one example, each audio peripheral may be distinguished by a unique identifier or address (e.g., DEV_ADDR=x).

In one example, the transport link manager 1210 enables control information transport on the first transport link 1222, disables control information transport on the second transport link 1223, enables control information transport on the third transport link 1224 and enables control information transport on the fourth transport link 1225.

Figure 13:
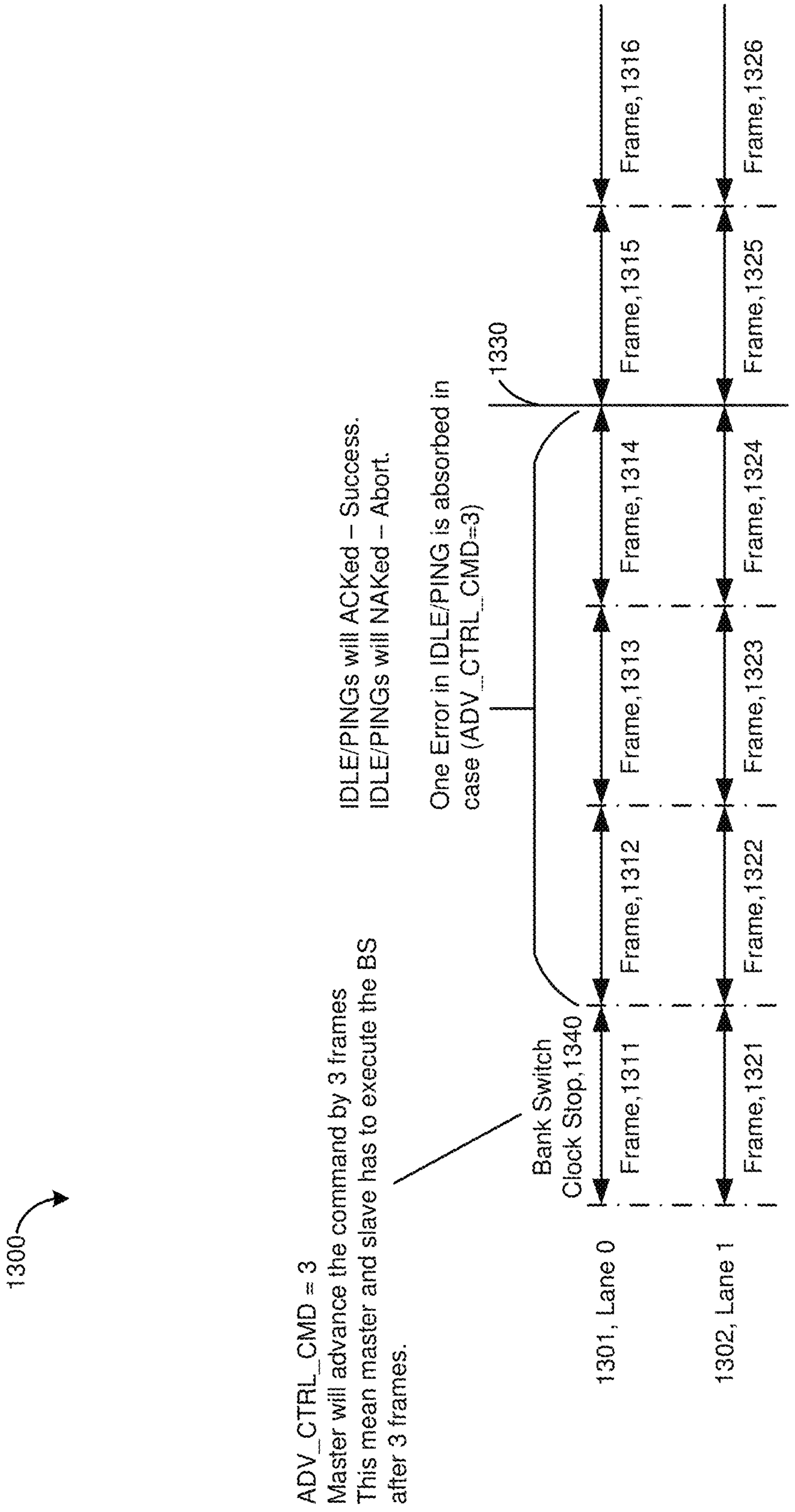
FIG. 13 illustrates an example of a virtual transport link manager synchronization scenario.

FIG. 13 illustrates an example of a virtual transport link manager synchronization scenario 1300. In one example, each transport link in a plurality of transport links may provide a plurality of response signals on different lanes for a plurality of directives. In one example, the plurality of response signals require synchronization (i.e., alignment to a common time scale). In one example, synchronization ensures proper transport link operation even if a response signal changes transport link properties, such as bank switch, clock stop, etc.

In one example, FIG. 13 shows a first lane (e.g., Lane0) timeline 1301 and a second lane (e.g., Lane1) timeline 1302. In one example, the first lane timeline 1301 is partitioned into a first lane first frame 1311, a first lane second frame 1312, a first lane third frame 1313, a first lane fourth frame 1314, a first lane fifth frame 1315 and a first lane sixth frame 1316. In one example, the second lane timeline 1302 is partitioned into a second lane first frame 1321, a second lane second frame 1322, a second lane third frame 1323, a second lane fourth frame 1324, a second lane fifth frame 1325 and a second lane sixth frame 1326.

In one example, a directive time for a reconfiguration directive may be configured by advancing from an intended time point 1330 to an earlier frame 1340 using an advancement directive (e.g., ADV_CTRL_CMD=q). In one example, the advancement directive may advance reconfiguration directive transmittal by q frames prior to the intended time point 1330, where q is an configurable integer. In one example, the intended time point 1330 is a desired reconfiguration execution time.

In one example, the advancement directive allows timing margin for execution of the reconfiguration directive (e.g., bank switch, clock stop, etc.) and synchronizes a plurality of peripherals to a common time alignment. In one example, idle frames are processed prior to the intended time point 1330. In one example, if a peripheral of the plurality of peripherals responds with a negative acknowledgment (i.e., NACK) response to the reconfiguration directive, then other peripherals of the plurality of peripherals may be notified by transmittal of a NACK signal on all idle frames until the intended time point 1330. In one example, each peripheral of the plurality of peripherals checks for a quantity of successful idle commands greater than half of configured idle commands. In one example, a successful acknowledgment results in an ACK signal transmittal. In one example, a failed acknowledgment results in a NACK signal transmittal. In one example, the advancement directive is a configuration command form a transport link manager to a peripheral to send the reconfiguration directive earlier than the intended time point 1330. In one example, the advancement directive facilitates synchronization of reconfiguration directives on all lanes with an enabled virtual transport link manager.

Figure 14:
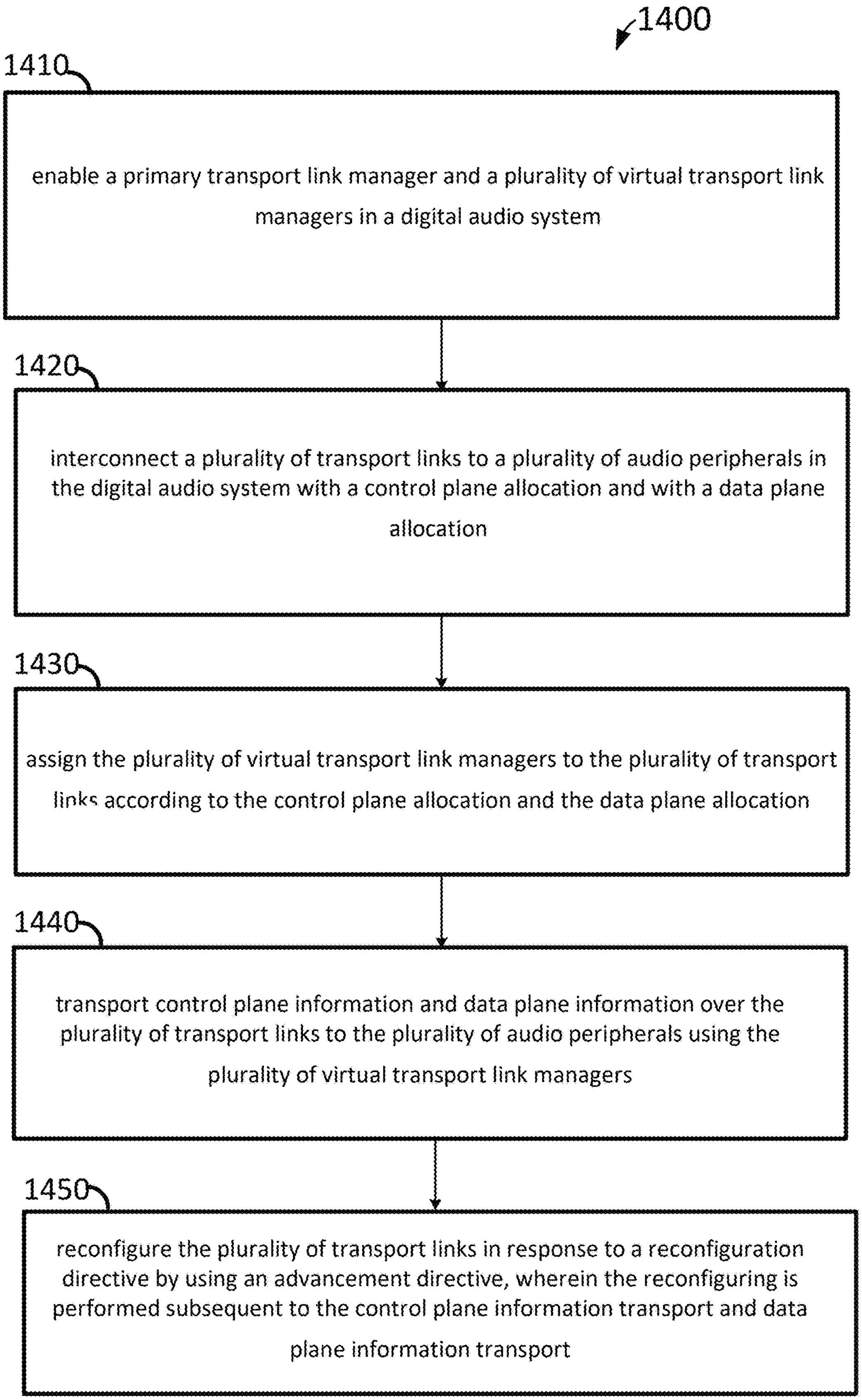
FIG. 14 illustrates an example flow diagram for flexible digital audio system interconnectivity.

FIG. 14 illustrates an example flow diagram 1400 for flexible digital audio system interconnectivity. In block 1410, enable a primary transport link manager and a plurality of virtual transport link managers in a digital audio system. In one example, a primary transport link manager and a plurality of virtual transport link managers are enabled in a digital audio system. In one example, the enablement is performed by a transport link manager, a data processor, a microcontroller, a finite state machine, etc.

In block 1420, interconnect a plurality of transport links to a plurality of audio peripherals in the digital audio system with a control plane allocation and with a data plane allocation. In one example, a plurality of transport links is interconnected to a plurality of audio peripherals in the digital audio system with a control plane allocation and with a data plane allocation. In one example, the interconnection includes a synchronous clock distribution to the plurality of audio peripherals. In one example, the synchronous clock distribution includes usage of a reference oscillator with integrated timing jitter less than a specified fraction of a synchronous clock cycle. In one example, the integrated timing jitter is less than 5% of the synchronous clock cycle. In one example, the interconnection includes an enumeration of the plurality of audio peripherals. In one example, the enumeration assigns identification labels to distinguish each audio peripheral in the plurality of audio peripherals.

In one example, if the interconnection of a transport link of the plurality of transport links includes both the control plane allocation and the data plane allocation, then set a transport link configuration word for the transport link to an enabled state. In one example, if the interconnection of a transport link of the plurality of transport links includes only a data plane allocation, set a transport link configuration word for the transport link to a disabled state. In one example, the control plane allocation governs configuration control and policy implementation. In one example, the data plane allocation governs data transport and data manipulation or transformation. In one example, the interconnection is performed by the primary transport link manager, a data processor, a microcontroller, a finite state machine, etc.

In block 1430, assign the plurality of virtual transport link managers to the plurality of transport links according to the control plane allocation and the data plane allocation. In one example, the plurality of virtual transport link managers is assigned to the plurality of transport links according to the control plane allocation and the data plane allocation. In one example, the assignment is performed according to an arbitration policy. In one example, the arbitration policy is round robin allocation. In one example, the arbitration policy is a priority arbitration policy. In one example, a virtual transport link manager is assigned to a transport link if its transport link configuration word is in the enabled state. In one example, a virtual transport link manager is unassigned to a transport link if its transport link configuration word is in the disabled state. In one example, the assignment is performed by the primary transport link manager, a data processor, a microcontroller, a finite state machine, etc. In one example, the arbitration policy is performed by an arbiter.

In block 1440, transport control plane information and data plane information over the plurality of transport links to the plurality of audio peripherals using the plurality of virtual transport link managers. In one example, control plane information and data plane information are transported over the plurality of transport links to the plurality of audio peripherals using the plurality of virtual transport link managers. In one example, the transport includes receipt of acknowledgment signals and negative acknowledgment signals from the plurality of audio peripherals.

In block 1450, reconfigure the plurality of transport links in response to a reconfiguration directive by using an advancement directive, wherein the reconfiguring is performed subsequent to the control plane information transport and data plane information transport. In one example, the plurality of transport links is reconfigured in response to a reconfiguration directive by using an advancement directive, wherein the reconfiguring is performed subsequent to the control plane information transport and data plane information transport. That is, the reconfiguring uses an advancement directive.

In one example, the advancement directive may advance the reconfiguration directive by a configurable number of frames prior to an intended time point. In one example, the intended time point is a desired reconfiguration execution time. In one example, each transport link executes a transport link timeline demarcated by frames. In one example, idle frames may be transmitted on each transport link prior to the intended time point. In one example, reconfiguration is performed by the primary transport link manager, a data processor, a microcontroller, a finite state machine, etc. . . .

In one aspect, one or more of the steps for providing flexible digital audio system interconnectivity in FIG. 14 may be executed by one or more processors which may include hardware, software, firmware, etc. The one or more processors, for example, may be used to execute software or firmware needed to perform the steps in the flow diagram of FIG. 14. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another—even if they do not directly physically touch each other. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:

a first transport link configured to convey a first information;

a second transport link configured to convey a second information;

a virtual transport link manager, coupled to the first transport link, the virtual transport link manager configured to select between a primary lane with both control information and data information and a second lane with only data information for the first transport link, wherein the primary lane is a first transmission line and the second lane is a second transmission line as part of a multi-lane transport link and the second lane is not extracted from the primary lane;

a first audio peripheral coupled to the first transport link, the first audio peripheral configured to receive the first information;

a second audio peripheral coupled to the second transport link, the second audio peripheral configured to receive the second information; and a primary transport link manager configured to connect to the second transport link.

2. The apparatus of claim 1, wherein the first information is control information for a control plane.

3. The apparatus of claim 2, wherein the control information is conveyed to processing functions used for configuration control and policy implementation.

4. The apparatus of claim 2, wherein the second information is data information for a data plane.

5. The apparatus of claim 2, wherein the second information is another control information for another control plane.

6. The apparatus of claim 1, further comprising a frequency reference coupled to the first audio peripheral and the second audio peripheral, the frequency reference configured to generate a synchronous clock signal provided to the first audio peripheral and the second audio peripheral.

7. The apparatus of claim 6, wherein the frequency reference is a reference oscillator with frequency stability characteristics.

8. An apparatus for flexible digital audio system interconnectivity, the apparatus comprising:

means for assigning a plurality of virtual transport link managers to a plurality of transport links according to a control plane allocation and a data plane allocation; and means for transporting control plane information and data plane information over the plurality of transport links to a plurality of audio peripherals using the plurality of virtual transport link managers, wherein at least one of the plurality of transport links is selected between a primary lane with both control information and data information and a second lane with only data information for the at least one of the plurality of transport links, wherein the primary lane is a first transmission line and the second lane is a second transmission line as part of a multi-lane transport link and the second lane is not extracted from the primary lane.

9. The apparatus of claim 8, further comprising means for reconfiguring the plurality of transport links, wherein the means for reconfiguring is enabled in response to a reconfiguration directive and the means for reconfiguring uses an advancement directive subsequent to control plane information transport and data plane information transport.

10. The apparatus of claim 9, further comprising:

means for interconnecting the plurality of transport links to the plurality of audio peripherals with the control plane allocation and with the data plane allocation; and means for enabling a primary transport link manager and a plurality of virtual transport link managers in a digital audio system.

11. A method comprising:

assigning a plurality of virtual transport link managers to a plurality of transport links according to a control plane allocation and a data plane allocation; and transporting control plane information and data plane information over the plurality of transport links to a plurality of audio peripherals using the plurality of virtual transport link managers, wherein at least one of the plurality of transport links is selected between a primary lane with both control information and data information and a second lane with only data information for the at least one of the plurality of transport links, wherein the primary lane is a first transmission line and the second lane is a second transmission line as part of a multi-lane transport link and the second lane is not extracted from the primary lane.

12. The method of claim 11, further comprising interconnecting the plurality of transport links to the plurality of audio peripherals with the control plane allocation and with the data plane allocation to form an interconnection.

13. The method of claim 12, wherein the interconnection includes an enumeration of the plurality of audio peripherals.

14. The method of claim 13, wherein the enumeration assigns identification labels to distinguish each of the plurality of audio peripherals.

15. The method of claim 14, wherein if the interconnection of one of the plurality of transport links includes the control plane allocation and the data plane allocation, then set a transport link configuration word for the one of the plurality of transport links to an enabled state.

16. The method of claim 12, wherein the plurality of audio peripherals is in a digital audio system.

17. The method of claim 12, further comprising reconfiguring the plurality of transport links in response to a reconfiguration directive.

18. The method of claim 17, further comprising using an advancement directive for the reconfiguring.

19. The method of claim 18, wherein the reconfiguring is performed subsequent to performing the transporting control plane information and data plane information.

20. The method of claim 17, further comprising enabling a primary transport link manager and the plurality of virtual transport link managers in a digital audio system.

* * * * *